(12) United States Patent
Chou

(10) Patent No.: US 9,501,236 B2
(45) Date of Patent: Nov. 22, 2016

(54) DATA ACCESS SYSTEM AND INSTRUCTION MANAGEMENT DEVICE THEREOF

(71) Applicant: Hung-Chien Chou, Taichung (TW)

(72) Inventor: Hung-Chien Chou, Taichung (TW)

( * ) Notice: Subject to any disclaimer, the term of this patent is extended or adjusted under 35 U.S.C. 154(b) by 286 days.

(21) Appl. No.: 14/491,730

(22) Filed: Sep. 19, 2014

(65) Prior Publication Data

US 2015/0089174 A1 Mar. 26, 2015

(30) Foreign Application Priority Data

Sep. 24, 2013 (TW) .............................. 102134287 A

(51) Int. Cl.
*G06F 21/78* (2013.01)
*G06F 3/06* (2006.01)

(52) U.S. Cl.
CPC ........... *G06F 3/0622* (2013.01); *G06F 3/0614* (2013.01); *G06F 3/0655* (2013.01); *G06F 3/0659* (2013.01); *G06F 3/0673* (2013.01); *G06F 21/78* (2013.01)

(58) Field of Classification Search
None
See application file for complete search history.

(56) References Cited

U.S. PATENT DOCUMENTS

| | | | | |
|---|---|---|---|---|
| 5,987,557 A * | 11/1999 | Ebrahim | ............. | G06F 12/1483 710/200 |
| 8,782,434 B1 * | 7/2014 | Ghose | .................. | G06F 9/3851 711/118 |
| 2003/0065933 A1 * | 4/2003 | Hashimoto | ........... | G06F 21/123 713/194 |
| 2004/0213237 A1 * | 10/2004 | Yasue | ................ | H04L 63/0227 370/392 |
| 2005/0066354 A1 * | 3/2005 | Dellow | ............... | G06F 12/1483 725/30 |
| 2005/0071723 A1 * | 3/2005 | Luick | ..................... | G11C 29/76 714/747 |
| 2008/0082772 A1 * | 4/2008 | Savagaonkar | ........ | G06F 12/145 711/163 |
| 2011/0072314 A1 | 3/2011 | Wu | | |
| 2012/0030332 A1 * | 2/2012 | Fukushima | ......... | H04L 41/0672 709/223 |
| 2012/0042134 A1 * | 2/2012 | Risan | ..................... | G06F 21/10 711/154 |
| 2014/0115279 A1 * | 4/2014 | Chirca | ................ | H04L 63/0263 711/151 |
| 2014/0201822 A1 * | 7/2014 | Fullerton | ................ | G06F 21/53 726/4 |
| 2014/0365735 A1 * | 12/2014 | Kuwamura | .......... | G06F 8/4442 711/144 |

FOREIGN PATENT DOCUMENTS

| TW | 200802027 A | 1/2008 |
|---|---|---|
| TW | 201017469 A | 5/2010 |

OTHER PUBLICATIONS

Taiwanese Search Report completed Feb. 6, 2015, issued in corresponding Taiwanese Patent Application No. 102134287, filed Sep. 24, 2013, 1 page.

* cited by examiner

*Primary Examiner* — Sean D Rossiter
*Assistant Examiner* — Jean Edouard
(74) *Attorney, Agent, or Firm* — Christensen O'Connor Johnson Kindness PLLC

(57) ABSTRACT

A data access system includes a storage device, an instruction management device, and a host device. The host device is configured to transmit an access instruction associated with an access operation directed to an intended physical address of the storage device to the instruction management device, which compares the access instruction with a specified instruction list. When the instruction management device determines that the access instruction conforms with an instruction included in the specified instruction list, the instruction management device is configured to generate a modified access instruction associated with an access operation directed to a target physical address that is different from the intended physical address of the storage device.

15 Claims, 2 Drawing Sheets

DATA ACCESS SYSTEM AND INSTRUCTION MANAGEMENT DEVICE THEREOF

CROSS-REFERENCE TO RELATED APPLICATION

This application claims priority of Taiwanese Patent Application No. 102134287, filed on Sep. 24, 2013.

FIELD OF THE INVENTION

The invention relates to a data access system, and an instruction management device included in the data access system.

BACKGROUND OF THE INVENTION

Data security has been an important issue in the field of computer science. In the case of a storage device, one crucial consideration is preventing theft of the data stored in the storage device. That is, the storage device generally is unable to distinguish a normal access attempt and a malicious access attempt.

Furthermore, damage in a specific sector of the storage device may not be apparent to a user, and unknowing attempts to access the specific sector may be harmful to the entire storage device.

SUMMARY OF THE INVENTION

Therefore, an object of the present invention is to provide a data access system that is able to address at least one of the above drawbacks of the prior art.

Accordingly, a data access system of the present invention comprises a storage device, an instruction management device, and a host device.

The instruction management device is coupled to the storage device and includes a comparing module, an instruction processing module and a storage medium. The instruction management device has a specified instruction list established therein.

The host device is coupled to the instruction management device and is configured to transmit an access instruction to the instruction management device. The access operation is associated with an access operation directed to an intended physical address of the storage device.

The comparing module of the instruction management device is configured to compare the access instruction received from the host device with the specified instruction list. When the comparing module determines that the access instruction conforms with an instruction included in the specified instruction list, the instruction processing module is configured to generate a modified access instruction associated with an access operation directed to a target physical address that is different from the intended physical address of the storage device.

Another object of the present invention is to provide an instruction management device for use in a data access system.

Accordingly, an instruction management device of the present invention is to be coupled between a host device and a storage device for processing an access instruction from the host device. The access instruction is associated with an access operation directed to an intended physical address of the storage device. The instruction management device has a specified instruction list established therein and comprises a comparing module, a storage medium, and an instruction processing module.

The comparing module is configured to compare the access instruction received from the host device with the specified instruction list.

When the comparing module determines that the access instruction conforms with an instruction included in the specified instruction list, the instruction processing module is configured to generate a modified access instruction associated with an access operation directed to a target physical address that is different from the intended physical address of the storage device.

BRIEF DESCRIPTION OF THE DRAWINGS

Other features and advantages of the present invention will become apparent in the following detailed description of an embodiment with reference to the accompanying drawings, of which.

DETAILED DESCRIPTION OF THE EMBODIMENT

Figure 1:
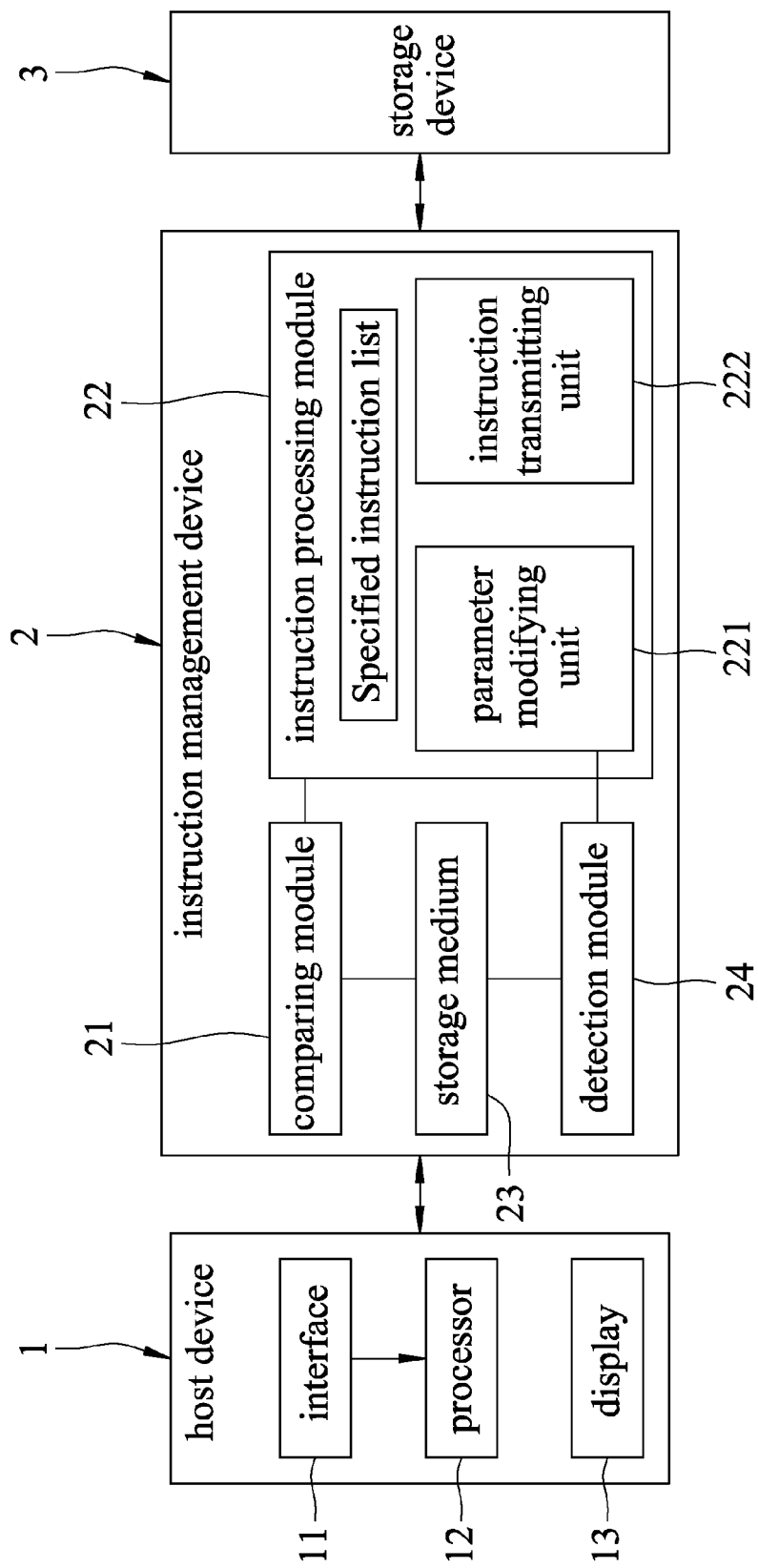
FIG. 1 is a block diagram of a data access system according to an embodiment of the present invention.

Referring to FIG. 1, a data access system according to an embodiment of the present invention comprises a host device 1, an instruction management device 2, and a storage device 3.

The host device 1 maybe embodied using a personal computer, a laptop computer, etc. The host device 1 includes an interface 11, a processor 12, and a display 13. The interface 11 may be a keyboard/mouse combination, a touch screen, etc.

In use, when a user intends to access the storage device 3, he/she may operate the interface 11 for inputting a command, which is in turn processed and converted by the processor 12 into a computer-readable instruction. In this embodiment, the command may be an attempt to access, for example, a data file stored in the storage device 3. In turn, the command is converted by the processor 12 into an access instruction that is associated with an access operation directed to an intended physical address of the storage device 3.

Specifically, the access instruction includes a source parameter indicating the intended physical address of the storage device 3 that is to be accessed.

The instruction management device 2 may be embodied using a chip or a physical device, and is connected between the host device 1 and the storage device 3 via a data transmission interface. The instruction management device 2 has a specified instruction list established therein. In some embodiments, editing of the specified instruction list by a user may be allowed using the interface 11.

The instruction management device 2 is for processing the access instruction, and includes a comparing module 21, an instruction processing module 22, a storage medium 23, and a detection module 24.

The comparing module 21 is to compare the access instruction received from the host device 1 with the specified instruction list. The instruction processing module 22 includes a parameter modifying unit 221 and an instruction transmitting unit 222.

Each of the storage medium 23 and the storage device 3 may be embodied using an Electrically-Erasable Programmable Read-Only Memory (EEPROM), a flash memory, a Hard Disk Drive (HDD), a Solid-State Drive (SSD), etc.

In this embodiment, before the access instruction is transmitted to the storage device 3 and executed (that is, the storage device 3 allowing the host device 1 to access the content stored in the intended physical address), the instruction management device 2 is configured to "intercept" the access instruction, and to perform a checking procedure to determine whether the access instruction contains malicious content. Specifically, the comparing module 21 is configured to compare the access instruction received from the host device with the specified instruction list. The specified instruction list includes at least one instruction that is known to be malicious to the instruction management device 2, and when it is determined by the comparing module 21 that the access instruction conforms with an instruction included in the specified instruction list, the instruction processing module 22 is configured to generate a modified access instruction associated with an access operation directed to a target physical address that is different from the intended physical address of the storage device 3.

As such, when the incoming access instruction is revealed as one known to be malicious to the instruction management device 2, the instruction processing module 22 alters the access instruction in order to direct the access operation away from the original intended physical address of the storage device 3.

This may be done by configuring the parameter modifying unit 221 which, when the comparing module 21 determines that the access instruction conforms with an instruction included in the specified instruction list, replaces the source parameter with a corresponding target parameter with reference to the specified instruction list.

The target parameter indicates a physical address of one of the storage medium 23 and the storage device 3 to serve as the target physical address. In practice, the target physical address may be selected from a physical address of the storage device 3 that is different from the intended physical address of the storage device 3, and a physical address of the storage medium 23.

Based on the target address, the instruction transmitting unit 222 is configured to operate in one of a first mode and a second mode. In the first mode, the instruction transmitting unit 222 transmits the modified access instruction to the storage device 3 for allowing access thereto (that is, the target physical address is a physical address of the storage device 3 that is different from the intended physical address of the storage device 3). On the other hand, in the second mode, the instruction transmitting unit 222 transmits the modified access instruction to the storage medium 23 for allowing access thereto (that is, the target physical address is a physical address of the storage medium 23).

The detection module 24 is for providing a means for determining whether a specific physical address in the storage device 3 is damaged (e.g., has an "error"). When the instruction transmitting unit 222 operates in the first mode, the detection module 24 is configured to perform a damage detection operation upon the storage device 3 at the target physical address.

When damage is detected, the detection module 24 terminates the access operation directed to the storage device 3. In some embodiments, the detection module 24 may further notify the instruction processing module 22 to generate and transmit an alternate access instruction associated with an access operation directed to an alternate physical address of the storage medium 23.

For example, when an access instruction is directed to a master boot record (MBR) of the storage device 3, the detection module 24 may be configured to detect whether the MBR is damaged. When damage is detected in the MBR, subsequent access thereto is terminated and redirected to an alternate physical address of the storage medium 23 which may have a backup MBR stored therein.

Figure 2:
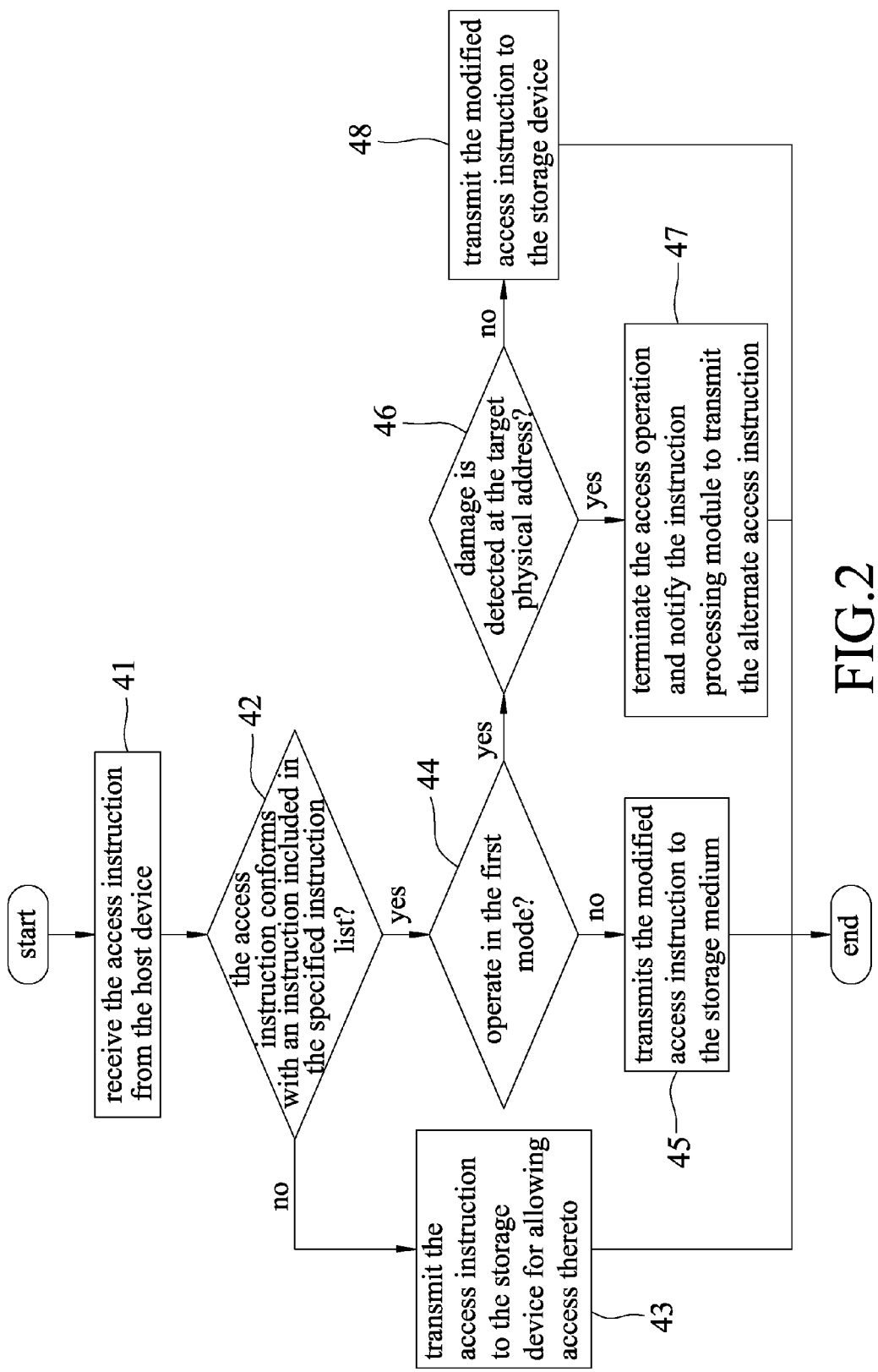
FIG. 2 is a flowchart to illustrate operation of the data access system.

The above-mentioned operation of the data access system may be summarized by the procedure as shown in FIG. 2.

In this example, the storage medium 23 and the storage device 3 are embodied using a HDD operated by an operating system (OS). The connection between the host device 1, the instruction management device 2 and the storage device 3 may be implemented using one of a Small Computer System Interface (SCSI), Serial Attached SCSI (SAS), Serial AT Attachment (SATA), etc.

In step 41, the instruction management device 2 receives the access instruction from the host device 1. The intended physical address (i.e., the source parameter) included in the access instruction may be represented using a Logical Block Addressing (LBA) parameter. Specifically, each physical address on the HDD is assigned a set of Cylinder-head-sector (CHS) numbers, and the set of CHS numbers can be then converted into a corresponding LBA parameter. The following Table 1 provides an exemplary relation between the CHS numbers and the corresponding LBA parameters.

TABLE 1

| Cylinder Number | Head Number | Block Number | Resulting LBA Parameter |
|---|---|---|---|
| 0 | 0 | 1 | 0 |
| 0 | 0 | 2 | 1 |
| ... | ... | ... | ... |
| 0 | 0 | 100 | 99 |
| 1 | 0 | 1 | 100 |
| 1 | 0 | 2 | 101 |
| ... | ... | ... | ... |

In step 42, the comparing module 21 compares the access instruction received from the host device 1 with the specified instruction list established in the instruction management device 2. When the comparing module 21 determines that the access instruction conforms with an instruction included in the specified instruction list (e.g., contains content that is known to be malicious to the instruction management device 2), the flow proceeds to step 44. Otherwise, the flow proceeds to step 43, and the instruction transmitting unit 222 transmits the access instruction to the storage device 3 for allowing access to the intended physical address thereof.

In step 44, the parameter modifying unit 221 generates the modified access instruction with the corresponding target parameter with reference to the specified instruction list. Afterward, based on the target parameter, the instruction transmitting unit 222 determines to operate in one of the first mode (the flow proceeds to step 46) and the second mode (the flow proceeds to step 45). In step 45, the instruction transmitting unit 222 operates in the second mode and transmits the modified access instruction to the storage medium 23.

In step 46, the instruction transmitting unit 222 operates in the first mode, and the detection module 24 performs the damage detection operation upon the storage device 3 at the target physical address. When damage is detected (the flow proceeds to step 47), the detection module 24 terminates the access operation directed to the storage device 3, and notifies the instruction processing module 22 to generate and transmit the alternate access instruction associated with an access operation directed to an alternate physical address of the storage medium 23. Otherwise (the flow proceeds to step 48), the instruction transmitting unit 222 transmits the modified access instruction to the storage device 3.

To sum up, the data access system of the present invention employs the instruction management device 2 that is configured to receive the access instruction for the storage device 3, and filters out unwanted access attempts by configuring the comparing module 21 to compare the access instruction and the pre-established specified instruction list, and then directs the access instruction away by generating a modified access instruction. By altering the access instruction, the storage device 3 may be relatively secured. In some embodiments, the instruction management device 2 maybe further enabled to perform damage detection to the storage device 3.

While the present invention has been described in connection with what is considered the most practical embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A data access system comprising:
    a storage device;
    an instruction management device that is coupled to said storage device and that includes a comparing module, an instruction processing module, and a storage medium, said instruction management device having a specified instruction list established therein; and
    a host device coupled to said instruction management device and configured to transmit an access instruction associated with an access operation directed to an intended physical address of said storage device to said instruction management device;
    wherein said comparing module of said instruction management device is configured to compare the access instruction received from said host device with the specified instruction list; and
    wherein, when said comparing module determines that the access instruction conforms with an instruction included in the specified instruction list, said instruction processing module is configured to generate a modified access instruction associated with an access operation directed to a target physical address that is different from the intended physical address of said storage device.

2. The data access system of claim 1, wherein the target physical address is selected from a physical address of said storage device that is different from the intended physical address of said storage device, and a physical address of said storage medium.

3. The data access system of claim 1, wherein:
    the access instruction includes a source parameter indicating the intended physical address of said storage device that is to be accessed; and
    said instruction processing module includes a parameter modifying unit which, when said comparing module determines that the access instruction conforms with an instruction included in the specified instruction list, is configured to generate the modified access instruction by replacing the source parameter with a corresponding target parameter with reference to the specified instruction list, the target parameter indicating a physical address of one of said storage medium and said storage device to serve as the target physical address.

4. The data access system of claim 3, wherein:
    said instruction processing module further includes an instruction transmitting unit that is configured to operate in one of a first mode and a second mode based on the target physical address;
    in the first mode, said instruction transmitting unit transmits the modified access instruction to said storage device for allowing access thereto; and
    in the second mode, said instruction transmitting unit transmits the modified access instruction to said storage medium for allowing access thereto.

5. The data access system of claim 4, wherein said instruction management device further includes a detection module and when said instruction transmitting unit operates in the first mode, said detection module is configured to:
    perform a damage detection operation upon said storage device at the target physical address; and
    terminate the access operation directed to said storage device when damage is detected.

6. The data access system of claim 5, wherein, when damage is detected by said detection module, said instruction processing module is configured to transmit an alternate access instruction associated with an access operation directed to an alternate physical address of said storage medium.

7. The data access system of claim 1, wherein said host device further includes an interface for allowing editing of the specified instruction list established in said instruction management device by a user.

8. The data access system of claim 1, wherein the specified instruction list includes an instruction that is known to be malicious to said instruction management device.

9. An instruction management device that is to be coupled between a host device and a storage device for processing an access instruction from the host device, the access instruction being associated with an access operation directed to an intended physical address of the storage device, said instruction management device having a specified instruction list established therein and comprising:
    a comparing module that is configured to compare the access instruction received from the host device with the specified instruction list;
    a storage medium; and
    an instruction processing module that, when said comparing module determines that the access instruction conforms with an instruction included in the specified instruction list, is configured to generate a modified access instruction associated with an access operation directed to a target physical address that is different from the intended physical address of said storage device.

10. The instruction management device of claim 9, wherein the target physical address is selected from a physical address of the storage device that is different from the intended physical address of the storage device, and a physical address of said storage medium.

11. The instruction management device of claim 9, the access instruction including a source parameter for indicating the intended physical address of the storage device that is to be accessed, wherein:
    said instruction processing module includes a parameter modifying unit which, when said comparing module determines that the access instruction conforms with an instruction included in the specified instruction list, is configured to generate the modified access instruction by replacing the source parameter with a corresponding target parameter with reference to the specified instruction list, the target parameter indicating a physical address of one of said storage medium and the storage device to serve as the target physical address.

12. The instruction management device of claim 11, wherein:
   said instruction processing module further includes an instruction transmitting unit that is configured to operate in one of a first mode and a second mode based on the target physical address;
   in the first mode, said instruction transmitting unit transmits the modified access instruction to the storage device for allowing access thereto; and
   in the second mode, said instruction transmitting unit transmits the modified access instruction to said storage medium for allowing access thereto.

13. The instruction management device of claim 12, wherein said instruction management device further includes a detection module and
   when said instruction transmitting unit operates in the first mode, said detection module is configured to:
   perform a damage detection operation upon said storage device at the target physical address; and
   terminate the access operation directed to said storage device when damage is detected.

14. The instruction management device of claim 13, wherein, when damage is detected by said detection module, said instruction processing module is configured to transmit an alternate access instruction associated with an access operation directed to an alternate physical address of said storage medium.

15. The instruction management device of claim 9, wherein the specified instruction list includes an instruction that is known to be malicious to said instruction management device.

* * * * *